J. B. SARGENT.
Sewing-Machine Casters.

No. 147,981.    Patented Feb. 24, 1874.

Witnesses

Joseph B. Sargent
Inventor
By Atty.

UNITED STATES PATENT OFFICE.

JOSEPH B. SARGENT, OF NEW HAVEN, CONNECTICUT.

IMPROVEMENT IN SEWING-MACHINE CASTERS.

Specification forming part of Letters Patent No. 147,981, dated February 24, 1874; application filed October 24, 1873.

*To all whom it may concern:*

Be it known that I, JOSEPH B. SARGENT, of New Haven, in the county of New Haven and State of Connecticut, have invented a new Improvement in Casters for Sewing-Machine Tables; and I do hereby declare the following, when taken in connection with the accompanying drawings and the letters of reference marked thereon, to be a full, clear, and exact description of the same, and which said drawings constitute part of this specification, and represent, in—

Figure 1:
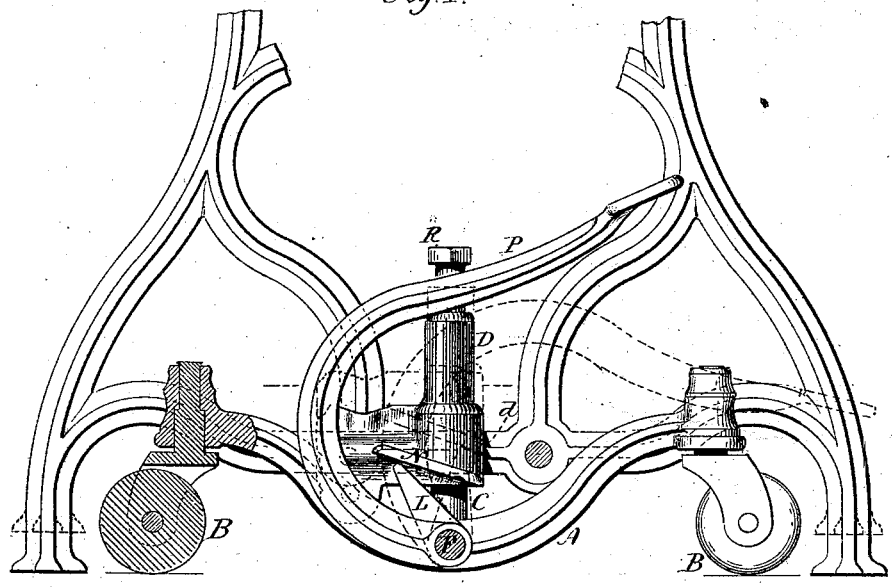
Figure 2:
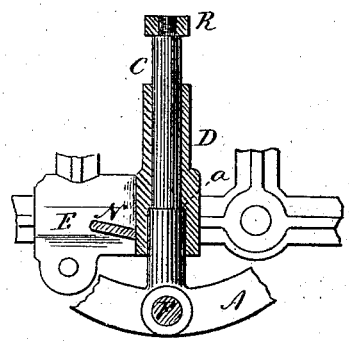
Figure 3:
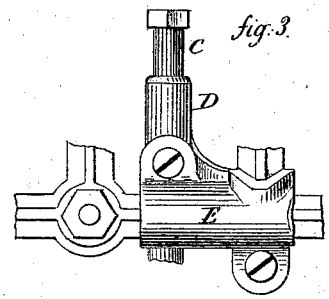

Figure 1, a transverse section of the lower portion of the table, looking toward one end; and in Figs. 2 and 3, detached views.

This invention relates to an improvement in method or attaching and operating casters of sewing-machine tables; and the invention consists in a yoke having a caster-wheel pivoted in each end, and at or near the center of the yoke a vertical spindle, extending up through a coupling or connection to the table, combined with a cam and lever, by means of which the machine may be raised to throw it off its legs onto the casters, or vice versa, as more fully hereinafter described.

A is a yoke, in each end of which is arranged a caster-wheel, B, in substantially the usual manner. At the center of the yoke a vertical spindle, C, is formed or attached, and this spindle is fitted into a socket, D. This socket is made a part of the clamping device E. This clamping device is formed in two parts, so as to embrace and be firmly secured to some portion of the table-leg. The spindle C is formed with a shoulder, *a*, and the socket with a corresponding shoulder, to prevent the yoke from rising too high, and this shoulder should be slightly above the point where the table-leg will rest upon the floor and be free from the caster, and the spindle extends above the socket, so that the leg may be raised from the yoke to throw the weight upon the casters. A corresponding yoke is fitted to each leg— that is, one at or near each end—and a shaft, F, extends from one yoke to the other, having a bearing in each. Upon this shaft a cam, L, is securely fixed, and above the cam, on the clamping device, an inclined flange, N, is formed, so that by turning the cam it will bear against and run down this incline and raise the legs. To actuate the cam a lever, P, is attached to the shaft F, and preferably extends up to a convenient position to place the foot upon, as seen in Fig. 1, so that by depressing the lever P, as denoted by the broken lines in Fig. 1, the rod F will be turned and the cams thrown up, as also denoted by the broken lines in Fig. 1, and raise the legs of the machine to rest upon the casters. When the cam is turned to this required position it falls into a notch or slight recess, *d*, in the flange N, and is thereby retained in that position so long as it is desirable that the machine should rest upon the casters, but easily turned therefrom by raising the lever P to place the machine upon its legs.

To prevent the yoke from falling from the socket when the machine is raised otherwise than by the cam L, I place a nut or head, R, on the upper end of the spindle, which will strike the socket and prevent the separation of the machine from the casters.

I claim as my invention—

1. The yoke A, having a caster arranged in each end, and combined with a cam, L, a device for operating the same, and the incline N, the latter attached to or made a part of the table-leg, so that through the movement of the said cam the table will be raised, substantially as described.

2. In combination with the yoke A and its casters B, the vertical spindle C on the yoke, and the socket D, attached to or made a part of the frame, and in which the spindle works, the said spindle provided with a nut or head, R, substantially as and for the purpose described.

3. The combination of the yoke A and its casters B, the incline N, attached to or made a part of the machine, the cam L, and the lever P, all substantially as and for the purpose described.

4. The clamp E, by means of which the yoke and casters are attached to the machine, when formed with a flange, N, as a part of the same, and against which the cam acts, substantially as and for the purpose described.

5. The combination of the yoke A and its casters B, the cam L, and flange N, when the said flange is formed with the notch *d*, substantially as and for the purpose described.

JOSEPH B. SARGENT.

Witnesses:
 A. J. TIBBITS,
 J. H. SHUMWAY.